(No Model.)
G. W. RATHSAM.
FLOWER POT MACHINE.
No. 434,200. Patented Aug. 12, 1890.
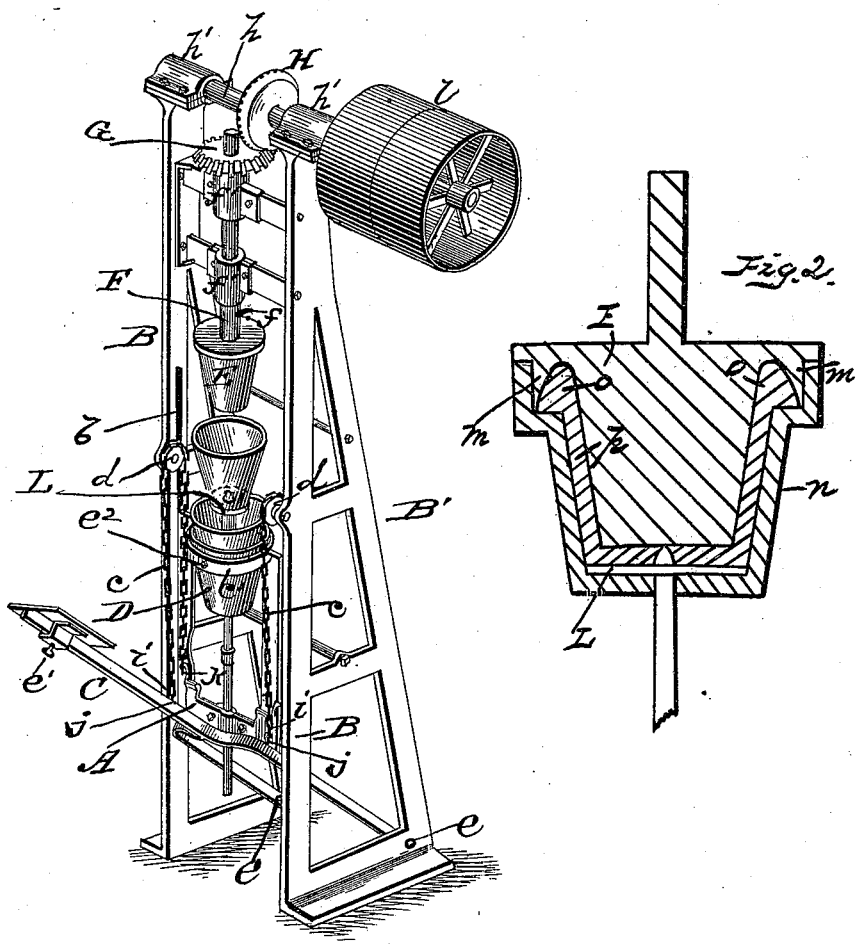
Witnesses
Fred W. Cornwall
S. C. Bates
Inventor
George W. Rathsam
By Wm C. Bates
Attorney

UNITED STATES PATENT OFFICE.

GEORGE W. RATHSAM, OF INDIANAPOLIS, INDIANA.

FLOWER-POT MACHINE.

SPECIFICATION forming part of Letters Patent No. 434,200, dated August 12, 1890.

Application filed January 9, 1890. Serial No. 336,430. (No model.)

*To all whom it may concern:*

Be it known that I, GEORGE W. RATHSAM, a citizen of the United States, residing at Indianapolis, in the county of Marion and State of Indiana, have invented certain new and useful Improvements in Flower-Pot Machines; and I do hereby declare the following to be a full, clear, and exact description of the invention, such as will enable others skilled in the art to which it appertains to make and use the same.

This invention has relation to improvements in devices for manufacturing flower-pots; and it consists in the novel construction and arrangement of parts, all as will be hereinafter fully set forth.

The present device is an improvement on the patent for flower-pot machines granted to me on the 12th day of July, 1881, and numbered 244,304; and the present improvement consists, mainly, of a treadle having an adjustable foot-piece, chains connected thereto, (the said treadle,) and the vertical slide, with other parts, as will be hereinafter described, and in combination with said parts.

The annexed drawings, to which reference is made, fully illustrate my invention, in which—

Figure 1 represents a perspective view of my improved flower-pot machine, and Fig. 2 is a sectional view.

Referring by letter to the accompanying drawings, A designates a vertically-sliding frame, having its movement in slots $b$ of the front uprights B B of the frame B' of the machine. This frame A has its adjustment through the medium of the lever or treadle C, the chains $c$, and pulleys $d$. This treadle is pivoted at $e$ to the main frame, and the foot-piece thereon is set by a screw $e'$ after the same has been adjusted on said treadle. The upper cross-piece of the frame A is centrally provided with a ring $c'$, in which rests the exterior mold D, secured therein by a set-screw $e^2$.

E represents the interior core or former, which is on the lower end of the shaft F, and is adjustable thereon and is held by a set-screw $f$, said shaft working in bearings $f'$ $f''$ and carrying at its upper end a gear-wheel G, which meshes with a gear-wheel H, mounted on a shaft $h$, journaled in bearings $h'$ on the main frame of the machine. The end $i$ of each chain is connected to the treadle, as at $j$, and passes over a grooved pulley $d$, and the opposite end of said chain is connected to the vertically-sliding frame, as shown at $k$.

The operation of my machine is as follows: Motion is communicated to the core by the belt-wheel $l$ and gear-wheels aforesaid, and the interior plate L is then adjusted to suit the desired height of the pot to be made, and clay is then put in, after being dipped in coal or other oil, and by pressing down the treadle and through the medium of chains, the frame A, carrying the mold, is raised, so that it will inclose the revolving core, which completes the operation of forming the pot, any surplus material being forced out over the edge of the exterior mold. The treadle being raised, the frame A and mold being lowered, leaves the pot on the bottom of the plate L, or the pot adheres to the revolving mold and is taken off.

It will be seen by the foregoing description and by reference to the annexed drawings that by the construction of the treadle, its chains, pulleys, and the frame A, the latter slides even on both sides of the main frame and carries the mold up in a true vertical line, and with my device there is only one mold and one core needed for different sizes of pots, and the pots can be constructed with a rim at the top.

The plunger or core E is constructed with a downwardly-projecting flange $m$, the inner surface of which is rounded or beveled or curved outwardly. This flange enters the mold $n$ and presses the clay into the corners of the mold, at the same time forming the flange or projection $o$ on the upper end of the flower-pot $p$, all as clearly shown in Fig. 2 of the drawings.

What I claim is—

1. In a machine for making flower-pots, the combination, with the sliding frame and main frame, mold, core, and operating mechanism, of the treadle pivoted to the main frame, having the adjustable foot-piece, and the chains connected, respectively, to the frame and treadle and passing over pulleys, all as and for the purpose set forth.

2. The within-described improved flower-pot machine, consisting of the main frame, carrying the mechanism, the sliding frame, treadle having the adjustable foot-piece and pivoted to the main frame, the chains therefor passing over the pulleys, the mold, and the core, the latter provided with the downwardly-projecting flange or rim $m$, all substantially as and for the purpose set forth.

In testimony whereof I affix my signature in presence of two witnesses.

GEORGE W. RATHSAM.

Witnesses:
LOUIS M. LINN,
H. J. EVERETT.